(12) United States Patent
Eagelman

(10) Patent No.: US 11,162,610 B2
(45) Date of Patent: Nov. 2, 2021

(54) TOOL AND METHOD FOR ACTUATING A VALVE AND METHOD FOR MAKING THE TOOL

(71) Applicant: Gulfstream Aerospace Corporation, Savannah, GA (US)

(72) Inventor: Joshua Eagelman, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 212 days.

(21) Appl. No.: 16/443,295

(22) Filed: Jun. 17, 2019

(65) Prior Publication Data
US 2020/0393059 A1 Dec. 17, 2020

(51) Int. Cl.
| | |
|---|---|
| *F16K 31/44* | (2006.01) |
| *F16K 31/60* | (2006.01) |
| *F16K 31/528* | (2006.01) |
| *B64D 37/20* | (2006.01) |

(52) U.S. Cl.
CPC .............. *F16K 31/44* (2013.01); *B64D 37/20* (2013.01); *F16K 31/528* (2013.01); *F16K 31/60* (2013.01)

(58) Field of Classification Search
CPC ........ F16K 31/44; F16K 31/60; F16K 31/528; F16K 31/50; B64D 37/20
USPC .............................. 251/77, 89–116, 251–256
See application file for complete search history.

(56) References Cited

U.S. PATENT DOCUMENTS

| | | | | |
|---|---|---|---|---|
| 1,597,794 A | * | 8/1926 | Horsburgh | F16K 31/528 251/215 |
| 1,912,304 A | * | 5/1933 | Selsey | B67D 3/045 222/513 |
| 2,755,059 A | | 7/1956 | Auwarter | |
| 3,046,802 A | * | 7/1962 | Janse | G05G 7/04 74/110 |
| 3,492,880 A | * | 2/1970 | Pearson | F16K 31/1635 74/57 |
| 3,780,980 A | * | 12/1973 | Kallel | F16K 31/10 251/129.2 |

(Continued)

FOREIGN PATENT DOCUMENTS

| | | |
|---|---|---|
| CA | 933838 A | 9/1973 |
| FR | 2590335 A1 | 5/1987 |
| FR | 2987614 A1 | 9/2013 |

OTHER PUBLICATIONS

European Patent Office, European Search Report for Application No. 20176961.9, dated Nov. 9, 2020.

*Primary Examiner* — John Bastianelli
(74) *Attorney, Agent, or Firm* — LKGlobal | Lorenz & Kopf, LLP

(57) ABSTRACT

Various non-limiting embodiments of a tool for actuating a valve, a method for making a tool for actuating a valve, and a method for actuating a valve, are provided. In one example, the tool includes a shaft defining a longitudinal axis and configured to transfer force to the valve for actuating the valve. A body has a wall surrounding a portion of the shaft. The wall defines a track that is formed therein and that has a track section substantially parallel to the longitudinal axis. A positive feature is coupled to the shaft and disposed in the track. The shaft is slidingly coupled to the body and when a force is applied to the shaft in a direction aligned with the longitudinal axis, the shaft moves relative to the body and the positive feature moves through the track section that restricts the shaft from being rotated about the longitudinal axis.

17 Claims, 7 Drawing Sheets

(56) References Cited

U.S. PATENT DOCUMENTS

| | | | |
|---|---|---|---|
| 4,293,117 A * | 10/1981 | Mueller | ........... F16K 5/162 |
| | | | 251/229 |
| 4,351,355 A | 9/1982 | Drew, Jr. et al. | |
| 4,453,579 A | 6/1984 | Gould | |
| 5,435,339 A * | 7/1995 | Hayes | ........... F16K 31/528 |
| | | | 137/315.04 |
| 6,464,203 B1 * | 10/2002 | Ishigaki | ........... F16K 3/10 |
| | | | 251/215 |

* cited by examiner

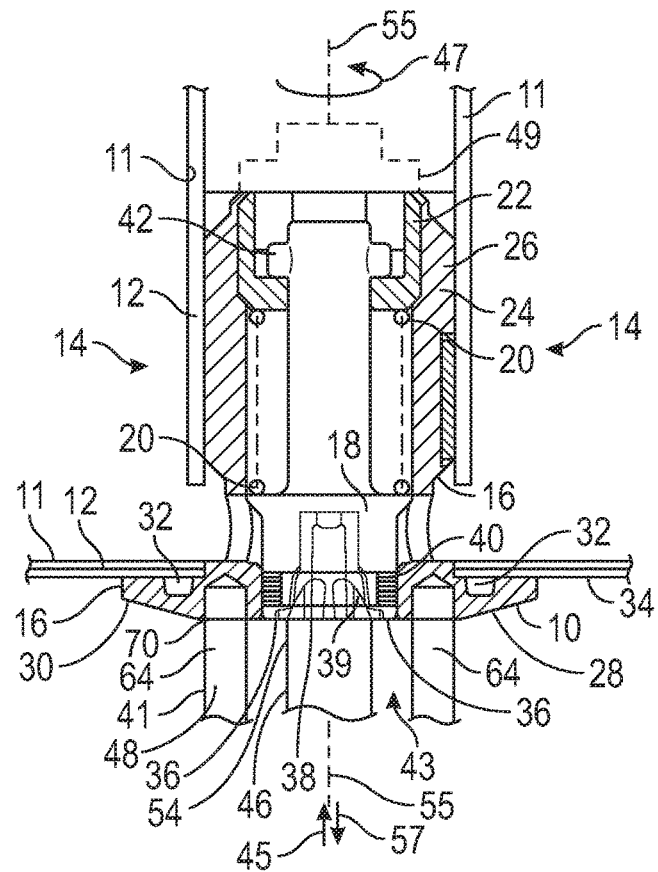
FIG. 1
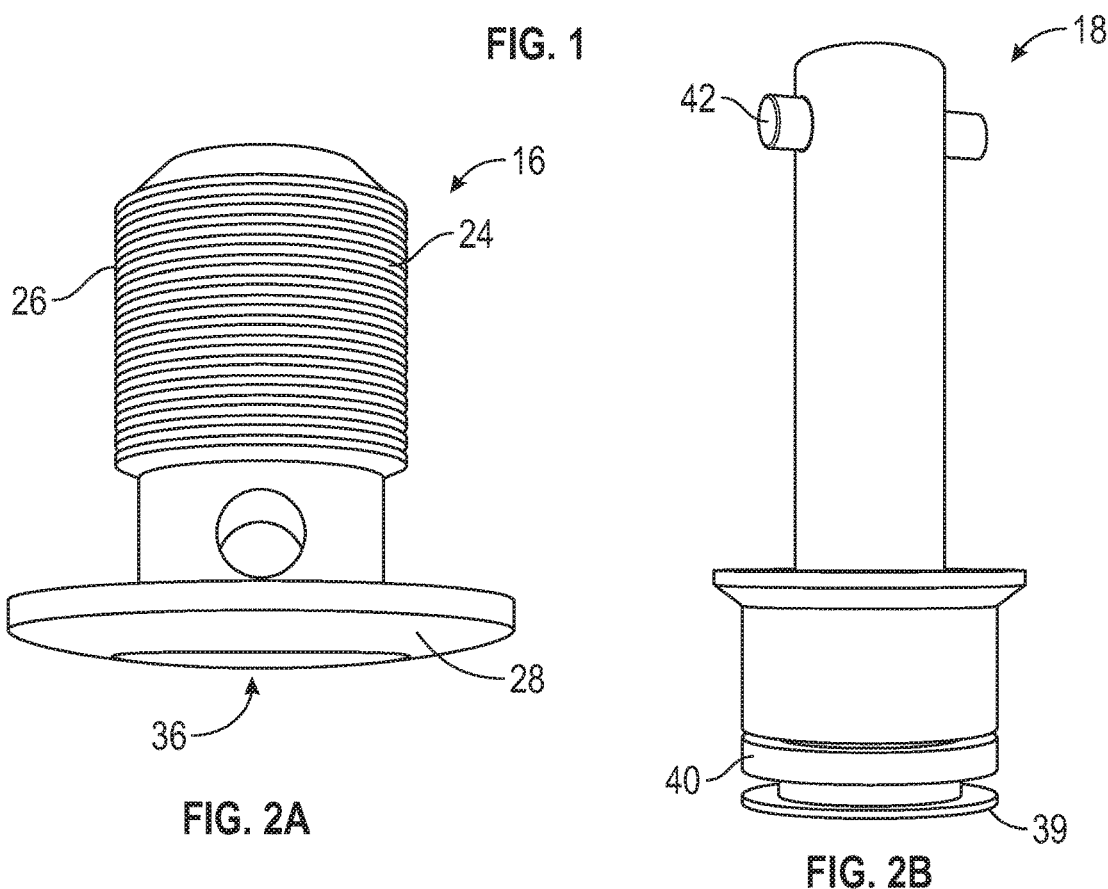
FIG. 2A
FIG. 2B

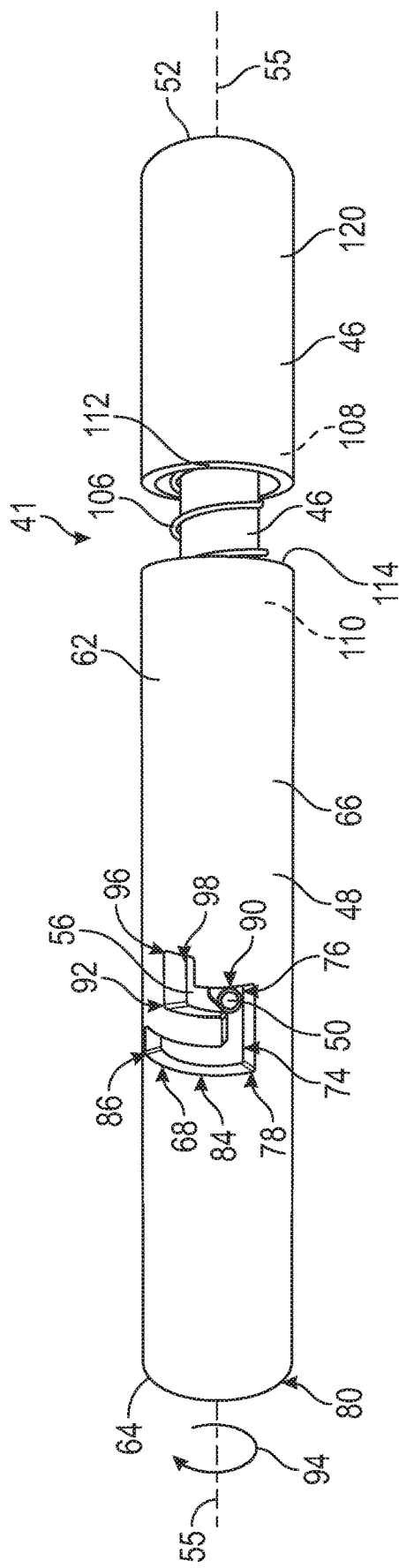
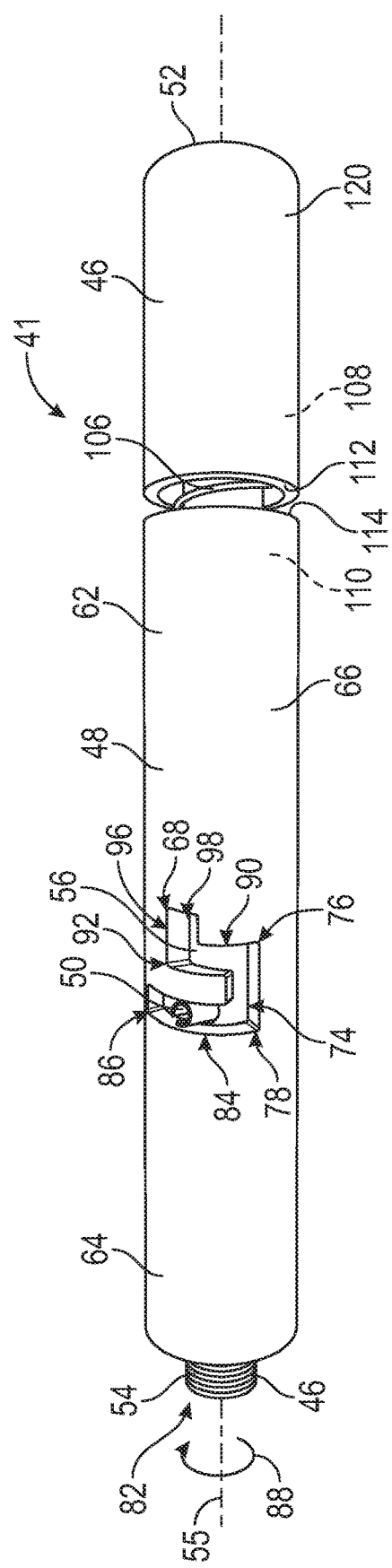
FIG. 4
FIG. 5

TOOL AND METHOD FOR ACTUATING A VALVE AND METHOD FOR MAKING THE TOOL

TECHNICAL FIELD

The technical field relates generally to valves, and more particularly, relates to tools for actuating valves such as, for example, a water drain valve for a fuel tank of an aircraft, methods for making such tools, and methods for using such tools for actuating valves.

BACKGROUND

Aircraft fuel systems have one or more fuel tanks for containing fuel for powering the engine(s) of the aircraft. The fuel tank(s) may be located, for example, on the underside of the aircraft's fuselage, wings, and/or tail. Aircraft fuel tanks can accumulate condensate and/or contaminants/deposits over time and/or use. The condensate and/or contaminants/deposits collect at the bottom of the fuel tank. If not removed, the condensate can freeze and expand in flight, thus clogging the intake from the fuel tank to the engine(s) of the aircraft. Likewise, contaminants/deposits can also clog the intake from the fuel tank to the aircraft engine(s). As such, many aircraft fuel tanks have a water drain valve(s) that provides access to the bottom of the fuel tank and thus a means for removing the condensate and/or contaminants/deposits. Many of these water drain valves are configured as poppet valves that are formed of a metal material(s).

Due to FAA regulations, it has become increasingly important for the wings and other areas of aircraft to contain less metal. Consequently, many water drain valves for aircraft fuel tanks are made with non-metal components and/or materials. To open a water drain valve, the operator uses, for example, a screwdriver to actuate the valve by initially pushing the valve inwardly towards the fuel tank and then consecutively rotating the valve. Unfortunately, many of the non-metal water drain valves for aircraft fuel tanks are less robust than the metal water drain valves and incorrect operation of the screwdriver by prematurely rotating the valve before the valve has been sufficiently pushed inwardly can result in the water drain valve being broken and/or damaged. This can result in the loss of fuel and/or the need for a new water drain valve, which can be costly and time-consuming to replace.

Accordingly, it is desirable to provide a tool for actuating valves, a method for making such tools, and a method for actuating valves that addresses one or more of the foregoing issues. Furthermore, other desirable features and characteristics of the various embodiments described herein will become apparent from the subsequent detailed description and the appended claims, taken in conjunction with the accompanying drawings and this background.

SUMMARY

Various non-limiting embodiments of a tool for actuating a valve, a method for making a tool for actuating a valve, and a method for actuating a valve, are provided herein.

In a first non-limiting embodiment, the tool includes, but is not limited to, a shaft defining a longitudinal axis and configured to transfer force to the valve for actuating the valve. The tool further includes, but is not limited to, a body having a wall surrounding a portion of the shaft. The wall defines a track that is formed therein and that has a first track section substantially parallel to the longitudinal axis. The tool further includes, but is not limited to, a positive feature coupled to the shaft and disposed in the track. The shaft is slidingly coupled to the body and when a force is applied to the shaft in a direction aligned with the longitudinal axis, the shaft moves relative to the body and the positive feature moves through the first track section that restricts the shaft from being rotated about the longitudinal axis.

In another non-limiting embodiment, the method for making the tool for actuating the valve includes, but is not limited to, obtaining a shaft that defines a longitudinal axis and that is configured to transfer force to the valve for actuating the valve. The method further includes, but is not limited to, positioning a wall of a body surrounding a portion of the shaft. The wall defines a track that is formed therein and that has a first track section substantially parallel to the longitudinal axis. The method further includes, but is not limited to, disposing a positive feature that is coupled to the shaft in the track. The method further includes, but is not limited to, slidingly coupling the shaft to the body such that when a force is applied to the shaft in a direction aligned with the longitudinal axis, the shaft moves relative to the body and the positive feature moves through the first track section that restricts the shaft from being rotated about the longitudinal axis.

In another non-limiting embodiment, the method for actuating the valve includes, but is not limited to, contacting the valve with a tool. The tool includes, but is not limited to, a shaft defining a longitudinal axis and configured to transfer force to the valve for actuating the valve. The tool further includes, but is not limited to, a body having a wall surrounding a portion of the shaft. The wall defines a track that is formed therein and that has a first track section substantially parallel to the longitudinal axis. The tool further includes, but is not limited to, a positive feature coupled to the shaft and disposed in the track. The shaft is slidingly coupled to the body. The method further includes, but is not limited to, applying a force to the shaft in a direction aligned with the longitudinal axis, moving the shaft relative to the body and the positive feature through the first track section that restricts the shaft from being rotated about the longitudinal axis.

BRIEF DESCRIPTION OF THE DRAWINGS

The various embodiments will hereinafter be described in conjunction with the following drawing figures, wherein like numerals denote like elements, and wherein:

FIG. 1 illustrates a cross-sectional view of a water drain valve in accordance with an exemplary embodiment;

FIG. 2A illustrates a side perspective view of a body of a water drain valve in accordance with an exemplary embodiment;

FIG. 2B illustrates a side perspective view of a valve portion of a water drain valve in accordance with an exemplary embodiment;

FIG. 4 illustrates a side perspective view of a tool for actuating a valve in which a shaft of the tool is in a nominal position in accordance with an exemplary embodiment;

FIG. 5 illustrates a side perspective view of a tool for actuating a valve in which a shaft of the tool is in a rotated-extended position in accordance with an exemplary embodiment;

DETAILED DESCRIPTION

Figure 2C:
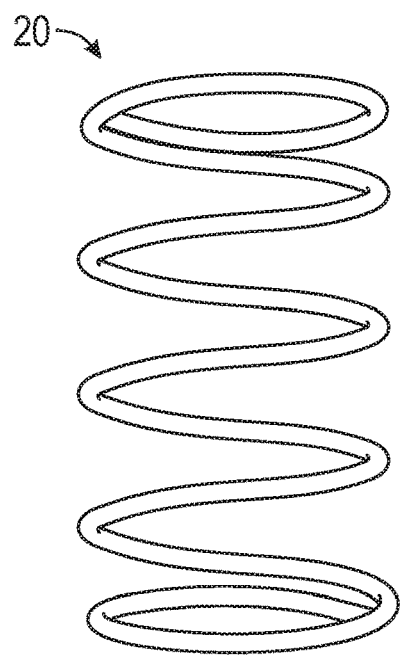
FIG. 2C illustrates a side perspective view of a biasing element of a water drain valve in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to tools for actuating a valve, methods for making tools for actuating a valve, and methods for actuating a valve. The exemplary embodiments taught herein provide a tool that includes a shaft. The shaft extends longitudinally to define a longitudinal axis and is configured to transfer force to a valve for actuating the valve. In one example, the valve is a water drain valve that is coupled to a bottom section of a fuel tank to provide fluid communication to an internal volume of the fuel tank for removing condensates and/or contaminants/deposits from the fuel tank.

The tool includes a body having a wall that surrounds at least a portion of the shaft. The wall defines a track that is formed in and/or through the wall and that has a first track section substantially parallel to the longitudinal axis. In an exemplary embodiment, the first track section extends distally from a first track section proximal end to a first track section distal end. The tool includes a positive feature that is coupled to the shaft and that is disposed in the track. The shaft is slidingly coupled to the body to allow relative movement between the shaft and the body.

In an exemplary embodiment, the track includes a second track section extending transversely from the first track section distal end to a second track section lateral end. In a non-limiting example, during operation for actuating the valve, a mechanic initially contacts the valve with the tool in which the distal end potion of the body of the tool abuts a fixed or non-moving portion (e.g., valve flange) of the valve or surrounding area. The mechanic then applies a force (e.g., via a translating movement or motion) to the tool in a direction aligned with the longitudinal axis to drive the shaft to push the valve, for example, inwardly toward the fuel tank. In response, the shaft moves relative to the body to push against and translate a moveable portion of the valve as the positive feature moves through the first track section that restricts the shaft from being rotated about the longitudinal axis. When the positive feature reaches the first track section distal end, the mechanic applies a rotating force (e.g., via a turning or twisting movement or motion) to the shaft to rotate the now translated moveable portion of the valve as the positive feature moves through the second track section that restricts the shaft from being translated along the longitudinal axis. In this translated, rotated position, the valve is open, for example to allow access to the bottom of a fuel tank for removing any condensates and/or contaminants/deposits.

In an exemplary embodiment, by restricting the motion of the shaft from being rotated relative to the body when the positive feature moves through the first track section, advantageously, premature rotation of the valve before the valve has been sufficiently pushed inwardly or otherwise translated is prevented. As such, damage to the water drain valve resulting from premature rotation of the valve before the valve has been sufficiently pushed inwardly or otherwise translated is prevented. Further, the potential loss of fuel and/or need for a replacement water drain valve that results from damage to the water drain valve is diminished.

FIG. 1 illustrates a cross-sectional view of a water drain valve 10 that is mounted in a fuel tank wall 12 of a fuel tank 11, for example, of an aircraft, and a tool 41 for actuating the water drain valve 10. Although the illustrated valve is configured as a water drain valve, it is to be understood that the valve in various other embodiments may be configured as a check valve, a flow control valve, a poppet valve, a sampling valve, or any other valve that can be actuated or otherwise open by a tool. Further, although the valve is illustrated as being mounted in a fuel tank wall of a fuel tank of an aircraft, it is to be understood that various other embodiments may include the valve mounted to other reservoirs, structures, or the like.

As will be discussed in further detail below, the fuel tank 11 is disposed in an area the aircraft, e.g., bottom area of the fuselage, wing(s), or the like, surrounded by aircraft skin 34. The fuel tank wall 12 of the fuel tank 11 surrounds a fuel tank cavity 14 (e.g., internal volume) that contains fuel for powering the engine(s) of the aircraft. The engine(s) of the aircraft receive fuel from the fuel tank 11 via a fuel intake (not illustrated). The fuel tank wall 12 may, for example, be made of a metallic material(s), a polymeric material(s) such as plastic, a composite material(s) including reinforcement fibers (e.g., fiberglass, etc.), and/or the like. In an exemplary embodiment, the fuel tank wall 12 is made of a plastic material. Further, the fuel tank wall 12 may be vented and/or pressurized to allow air to be fluidly communicated to the fuel tank 11 as fuel is being removed from the fuel tank 11 to the engine(s) via the fuel intake.

Figure 2D:
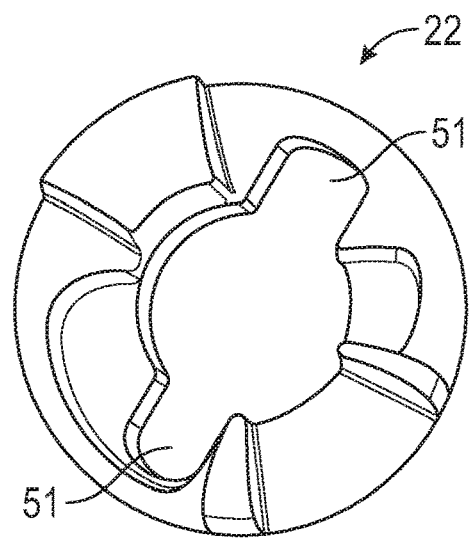
FIG. 2D illustrates a top view of a retainer of a water drain valve in accordance with an exemplary embodiment.
Figure 3:
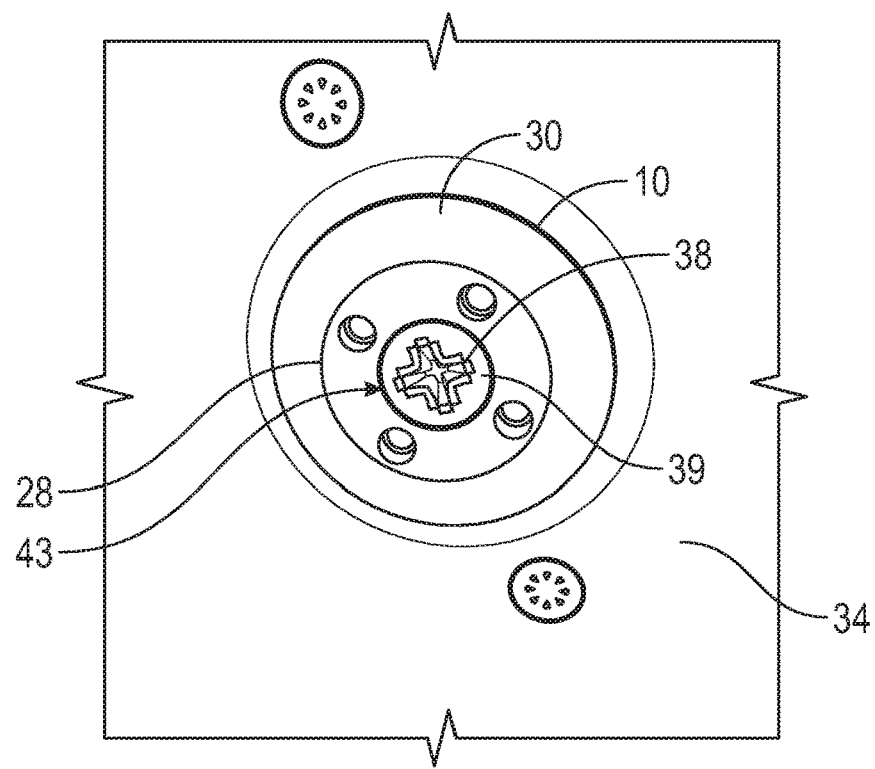
FIG. 3 illustrates a bottom perspective view of a water drain valve mounted on an aircraft in accordance with an exemplary embodiment.
Figure 6:
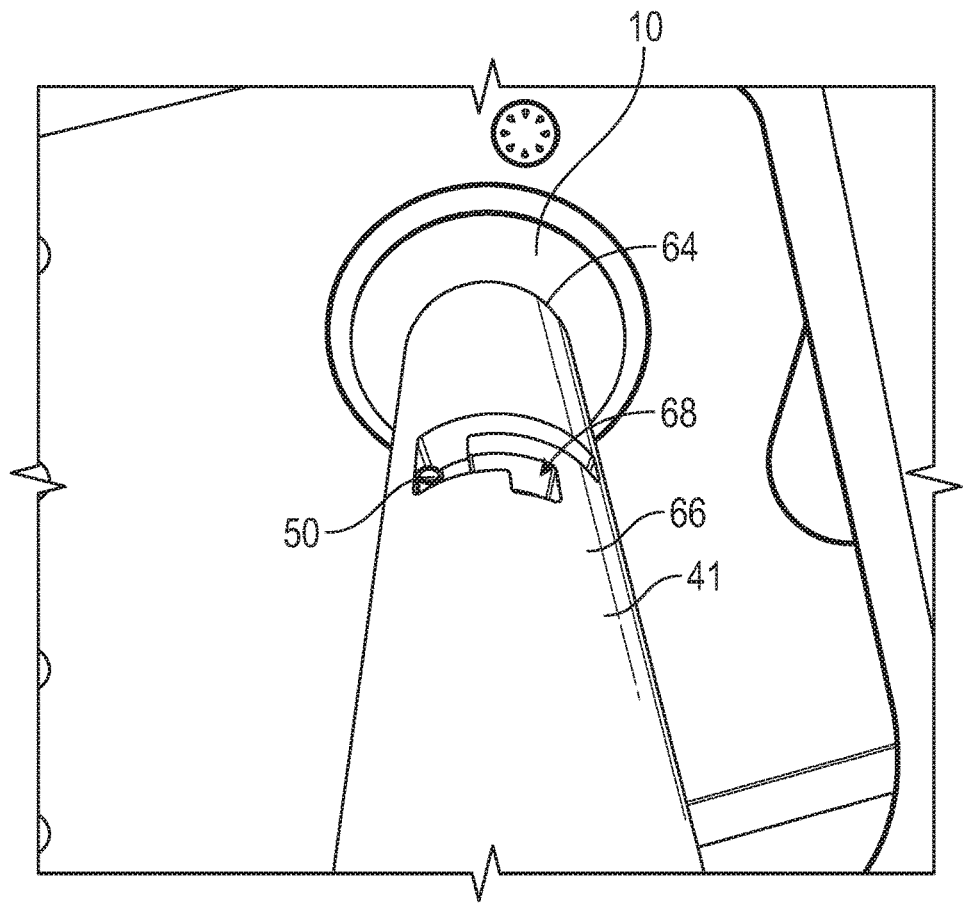
FIG. 6 illustrates a perspective view of a tool engaging a valve in accordance with an exemplary embodiment.
Figure 7:
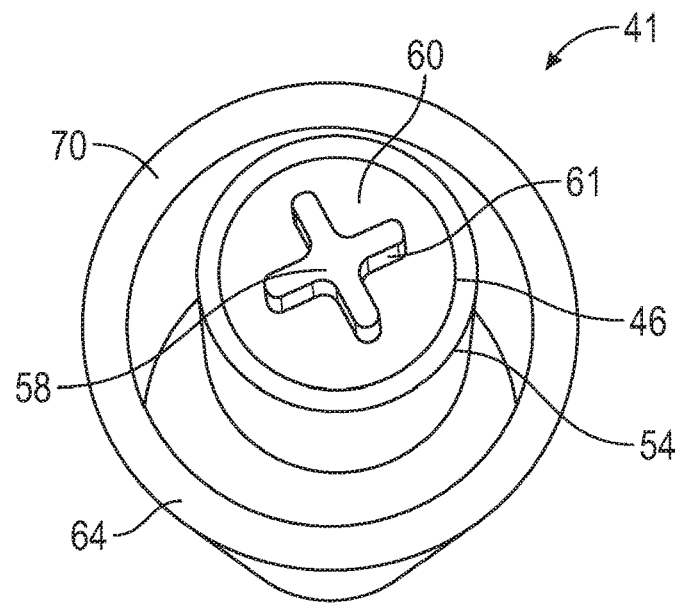
FIG. 7 illustrates a top view of a distal end of a shaft of a tool in accordance with an exemplary embodiment.
Figure 8:
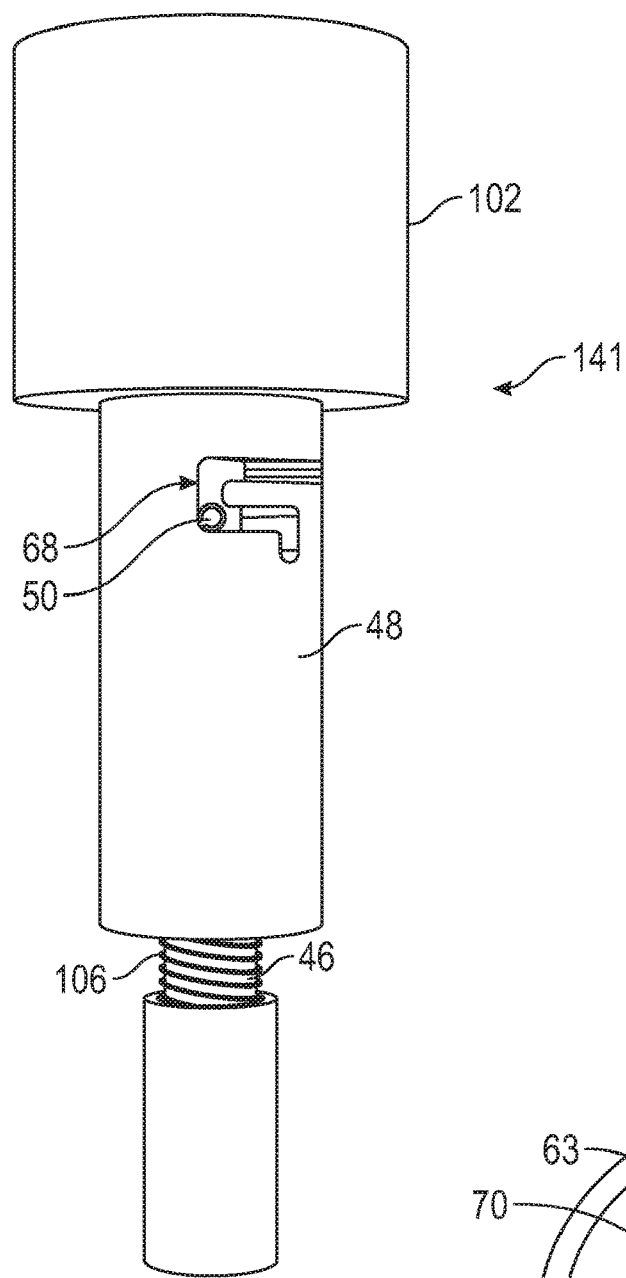
FIG. 8 illustrates a side view of a tool for actuating a valve in accordance with an exemplary embodiment.

Referring also to FIGS. 2A-3, in an exemplary embodiment, the water drain valve 10 includes a valve body 16, a valve stem 18, a biasing element 20 (e.g., spring or the like), and a retainer 22. The valve body 16 houses the valve stem 18, the biasing element 20, and the retainer 22. The valve body 16 includes a head portion 28 and a tubular portion 24 that extends distally from the head portion 28. The tubular portion 24 includes a threaded section 26 that engages threads in the fuel tank wall 12 to mount the water drain valve 10 in the fuel tank 11. The head portion 28 of the valve body 16 has a flange 30 and includes an O-ring 32 that is disposed on and/or against the back side of the flange 30. As illustrated, the back side of the flange 30 including the O-ring 32 sealingly interfaces with the aircraft skin 34 while the outer or front side (e.g., exposed side) of the head portion 28 of the water drain valve 10 is disposed proud of the aircraft skin 34.

The valve stem 18 is movable relative to the valve body 16 and has a head portion 39 that includes a valve engagement feature 38 for opening and closing the valve 10. As will be discussed in further detail below, the head portion 28 of the valve body 16 has an opening 36 that is surrounded by the flange 30. The valve engagement feature 38 is disposed in the opening 36, exposed and accessible to the tool 41 that engages the valve engagement feature 38 for actuating the valve 10. An O-ring 40 is circumferentially disposed on and about the valve stem 18 sealingly interfacing with the head portion 28 of the valve body 16 to prevent fuel from the fuel tank 11 from leaking between the valve body 16 and the valve stem 18. The valve stem 18 also has tabs 42 that extend radially outward from the distal end portion of the valve stem 18.

The valve engagement feature 38 has, for example, a negative feature configured to receive a positive feature(s) from a driver head (e.g., screw driver head), such as, for example, a slot drive, cross, Philips, Frierson, or a tri-point screw head. In an exemplary embodiment, the valve engagement feature 38 is configured as a negative cross-shaped feature that receives a positive cross-shaped feature.

In an exemplary embodiment, when the head portion 39 of the valve stem 18 is substantially flush with the head portion 28 of the valve body 16, the water drain valve 10 is in a closed position 43 preventing fuel from the fuel tank 11 from exiting through the valve 10. The biasing element 20 is disposed within the tubular portion 24 of the valve body 16 surrounding and engaging with an intermediate portion of the valve stem 18 to bias the valve 10 in the closed position 43. As will be discussed in further detail below, when the water drain valve 10 is in the closed position and the tool 41 is used to push or otherwise translate the valve stem 18 in a direction (indicated by single headed arrow 45) and subsequently rotate the valve stem 18 in a direction (indicated by single headed arrow 47), the water drain valve 10 is moved to an open position 49. As this occurs, the head portion 39 of the valve stem 18 moves distally relative to the head portion 28 of the valve body 16 and the tabs 42 likewise move in the direction 45 through openings 51 of the retainer 22 and are rotated in the direction 47 to rest upon distal surfaces of the retainer 22 to hold the valve stem 18 in the open position 49. As will be discussed in further detail below, in the open position 49, fuel including condensates and/or contaminants/deposits at the bottom of the fuel tank 11 can drain from the fuel tank cavity 14 through the opening 36 in the head portion 28 of the valve body 16.

In an exemplary embodiment, the water drain valve 10 is further configured to allow replacement of the O-ring 40. In one example and as will be discussed in further detail below, when the water drain valve 10 is in the closed position 43 and the tool 41 is used to rotate the valve stem 18 of the water drain valve 10 in the direction 47 (without pushing the valve stem 18 in the direction 45), the biasing element 20 pushes the valve stem 18 in a proximal or forward direction (indicated by single headed arrow 57) proud of the head portion 28 of the valve body 16 to an O-ring change position. In the O-ring change position, the tabs 42 of the valve stem 18 are retained by recessed surfaces of the retainer 22 and an intermediate portion of the valve stem 18 including the O-ring 40 is exposed forward of the opening 36 of the valve body 16. This allows a mechanic access to change and/or replace the O-ring 40 as needed.

Referring to FIGS. 1 and 3-7, as discussed above, the tool 41 is configured to engage the valve 10 to manually actuate the valve 10. The tool 41 includes a shaft 46 and a body 48 that are moveable relative to each other, and a positive feature 50 extending from the shaft 46 to the body 48. The shaft 46 extends distally from a proximal shaft end portion 52 to a distal shaft end portion 54 and defines a longitudinal axis 55. Disposed between the proximal shaft end portion 52 and the distal shaft end portion 54 is a shaft middle portion 56.

The positive feature 50 is coupled to the shaft middle portion 56 and extends radially outward therefrom. The positive feature 50 fixedly coupled to the shaft middle portion 56 by threaded engagement, affixed via an adhesive (e.g., epoxy adhesive or the like), welding, or the like. Alternatively, the positive feature 50 and the shaft 46 may be integrally formed as a monolithic structure, for example, via a molding or casting process. In an exemplary embodiment, the positive feature 50 is configured as a pin.

Figure 9:
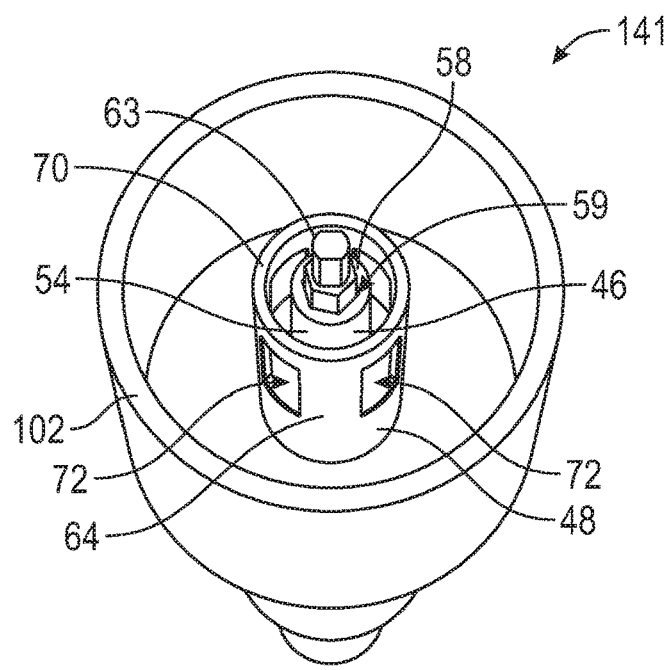
FIG. 9 illustrates a top perspective view of a tool for actuating a valve in accordance with an exemplary embodiment.
Figure 10:
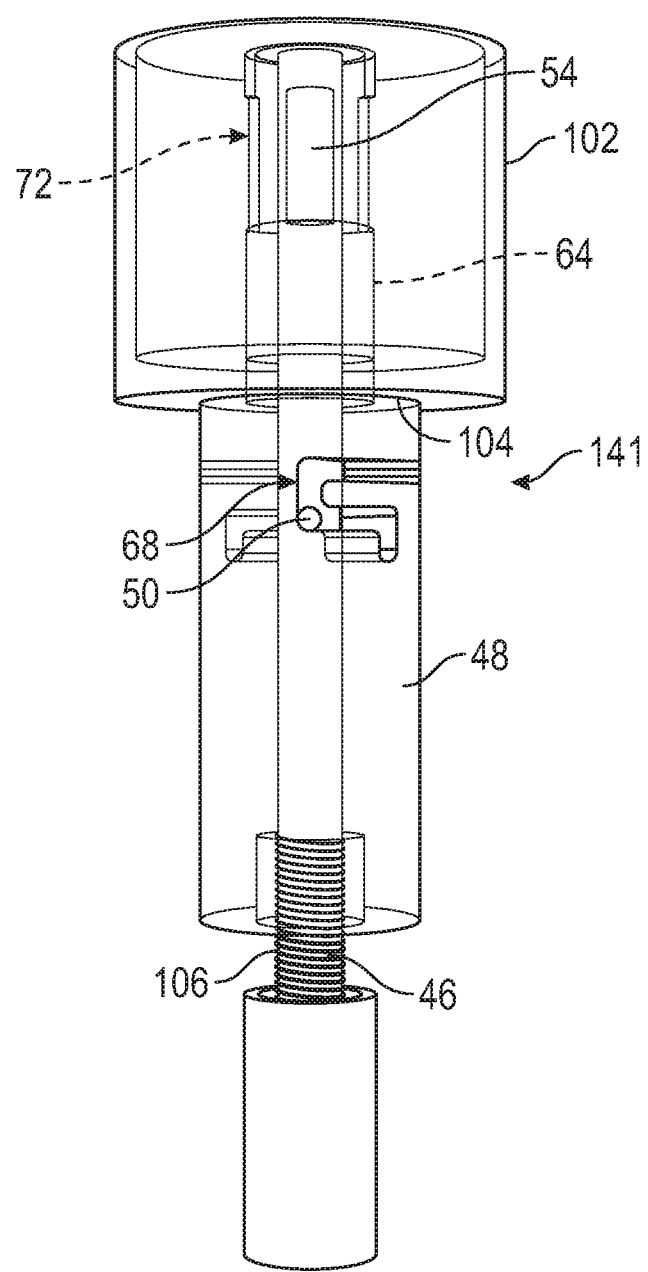
FIG. 10 illustrates a transparent, side view of a tool for actuating a valve in accordance with an exemplary embodiment.

In an exemplary embodiment, the distal shaft end portion 54 defines a feature 58 for coupling with the valve 10 for actuating the valve 10. In an exemplary embodiment, the feature 58 is disposed at a distal-most end 60 of the shaft 46 and is configured to engage the valve engagement feature 38 of the valve stem 18. The feature 58 may directly or indirectly engage with the valve engagement feature 38. Referring also to FIG. 9, in one example, the feature 58 is a pocket 59 configured to receive a positive feature that is configured to directly engage the valve engagement feature 38. In an exemplary embodiment, the pocket 59 is configured as a hexagonal-shaped socket. For example, the hexagonal-shaped socket receives and holds a hexagonal-shaped driver head 63 that directly engages the valve engagement feature 38. Referring back to FIGS. 1 and 3-7, in another example, the feature 58 is a positive feature 61 that is configured to directly engage the valve engagement feature 38. In an exemplary embodiment, the positive feature 61 is a positive cross-shaped feature for directly engaging with the valve engagement feature 38.

In an exemplary embodiment, the body 48 includes a substantially tubular shape and extends distally from a proximal body end portion 62 to a distal body end portion 64. The body 48 includes a wall 66 defining the substantially tubular shape that includes the proximal body end portion 62 and that surrounds at least a portion of the shaft 46. For example and as illustrated, the wall 66 surrounds at least a portion of the shaft middle portion 56.

The wall 66 has a track 68 that is formed in and/or through the wall 66. In an exemplary embodiment, the positive feature 50 extends radially outward from the shaft 46 such that at least an intermediate or end portion of the positive feature 50 is disposed in the track 68. In an exemplary embodiment, the body 48 is slidingly coupled to the shaft 46 and the positive feature 50 is configured to slide or otherwise move through the track 68 in response to translational and/or rotational relative movement between the body 48 and the shaft 46. Further, the track 68 is configured to guide movement of the positive feature 50 along a predefined path(s) as the positive feature 50 moves through the track 68 to restrict or otherwise limit movement of the positive feature 50 to directions defined by the predefined path(s). In this way, because the positive feature 50 is fixedly coupled to the shaft 46, movement of the shaft 46 is corresponding limited by the positive feature 50 interfacing with the track 68.

As illustrated, the distal body end portion 64 of the body 48 has an annular perimeter edge 70. When the feature 58 of the distal shaft end portion 54 engages with the valve engagement feature 38, the annular perimeter edge 70 interfaces with, for example, an outer surface of the flange 30 of the valve 10, an adjacent portion of the aircraft skin 34, and/or any surface that provides sufficient support to the body 48 so as to allow the shaft 46, in response to an applied force, to translate, rotate, or otherwise move relative to the body 48. In an exemplary embodiment, the annular perimeter edge 70 interfaces with an outer surface of the flange 30 of the valve 10 when the feature 58 of the distal shaft end portion 54 engages with the valve engagement feature 38.

As discussed above, the track 68 is configured to guide movement of the positive feature 50 along the predefined path(s) to restrict or otherwise limit movement of the positive feature 50 and correspondingly the shaft 46 for actuating the valve 10. In an exemplary embodiment, the track 68 has a track section 74 that is substantially parallel to the longitudinal axis 55 of the shaft 46 and that extends distally from a track section proximal end 76 to a track section distal end 78. When the positive feature 50 is proximate the track section proximal end 76, the shaft 46 is in a nominal position 80. When a pushing force is applied to the shaft 46 to extend the shaft 46 relative to the body 48 for actuating the valve 10, the positive feature 50 is guided through the track section 74 towards the track section distal end 78. When the positive feature 50 is proximate the track section distal end 78, the shaft 46 is in an extended position 82. As used herein, the phrase "proximate the track section . . . end" corresponds to the positive feature 50 being in a position that enables the positive feature 50 to move directly from one track section to another conjoined track section.

In an exemplary embodiment, the track 68 includes a track section 84 that extends transversely from the track section distal end 78 to a track section lateral end 86. When the shaft 46 is in the extended position 82 and a rotating force is applied to the shaft 46 to rotate the shaft relative to the body 48, the positive feature 50 is guided through the track section 84 from the track section distal end 78 towards the track section lateral end 86. When the positive feature 50 is proximate the track section lateral end 86, the shaft 46 is in a rotated-extended position 88. As will be discussed in further detail below, guiding the shaft 46 from the nominal position 80 to the extended position 82 and from the extended position 82 to the rotated-extended position 88 advantageously restricts motion of the shaft 46 from being rotated relative to the body 48 prematurely for opening the valve 10.

In an exemplary embodiment, the track 68 further includes a track section 90 that extends transversely from the track section proximal end 76 to a track section lateral end 92. As illustrated, the track section 90 is substantially parallel and proximal to the track section 86. When the shaft 46 is in the nominal position 80 and a rotating force is applied to the shaft 46 to rotate the shaft relative to the body 48, the positive feature 50 is guided through the track section 90 from the track section proximal end 76 towards the track section lateral end 92. When the positive feature 50 is proximate the track section lateral end 92, the shaft 46 is in a rotated-nominal position 94.

As illustrated, the track 68 further include a track section 96 that is substantially parallel to the longitudinal axis 55 of the shaft 46 and extends proximally from the track section lateral end 92 to a track section proximal end 98. As will be discussed in further detail below, when the shaft 46 is in the rotated-nominal position 94 and a translational force (e.g., spring force from a biasing element 106) is applied to the shaft 46, the positive feature 50 is guided through the track section 96 towards the track section proximal end 98. When the positive feature 50 is proximate the track section proximal end 98, the shaft 46 is in a retracted-rotated position. As will be discussed in further detail herein, guiding the shaft 46, which is engaged with the valve engagement feature 38, from the nominal position 80 to the rotated-nominal position 94 and from the rotated-nominal position 94 to the retracted-rotated position advantageously exposes the valve stem 18 of the valve 10 to allow a mechanic access to change and/or replace the O-ring 40 on the valve stem 18.

In an exemplary embodiment, the tool 41 further includes a biasing element 106 having an end portion 108 and an end portion 110. In one example, the biasing element 106 is configured as a coil spring. In an exemplary embodiment, the end portion 108 of the biasing element 106 engages with the shaft 46 and the end portion 110 engages with the body 48. As illustrated, the proximal shaft end portion 52 has an annular rim 112 that directly engages the end portion 108 of the biasing element 106. Likewise, the proximal body end portion 62 has an annular rim 114 that directly engages the end portion 110 of the biasing element 108. When the positive feature 50 is disposed in the track section 74, the biasing element 106 biases the shaft 46 towards the nominal position 80. Further, when the positive feature 50 is disposed in the track section 96, the biasing element 106 pushes the shaft proximally, thereby moving the positive feature 50 towards the track section proximal end 98 to bias the shaft 46 towards the retracted-rotated position 100.

In an exemplary embodiment, the tool 41 is manually operated, for example, by a mechanic to actuate the valve 10. In a non-limiting example, the mechanic positions the tool 41 on the valve 10 when the valve 10 is in the closed position. The feature 58 of the shaft 46 engages or otherwise couples to the valve engagement feature 38 of the valve 10 with the shaft 46 in the nominal position 80. The distal-most end 60 of the distal shaft end portion 54 of the shaft 46 and the annular perimeter edge 70 of the distal body end portion 64 of the body 48 are substantially flush or otherwise substantially aligned about a location along the longitudinal axis 55. As the feature 58 of the shaft 46 engages with the valve engagement feature 38, the annular perimeter edge 70 of the distal body end portion 64 interfaces with an outer surface of the flange 30 of the valve 10, an adjacent portion of the aircraft skin 34, and/or any adjacent fixed surface that provides sufficient support to the body 48.

Next, the mechanic applies a translational or pushing force to the shaft 46 in a direction aligned with the longitudinal axis 55, for example at the handle portion 120, to push the valve stem 18 inwardly towards the fuel tank 11. As the shaft 46 and correspondingly the valve stem 18 move relative to the body 48 in the direction 45, the tabs 42 move through the openings 51 of the retainer 22 and the positive feature 50 moves through the track section 74 from the track section proximal end 76 towards the track section distal end 78 until the shaft 46 is in the extended position 82. As discussed above, as the positive feature 50 moves through the track section 74, movement of the shaft 46 is guided along the longitudinal axis 55 while restricted from rotating about the longitudinal axis 55. In the extended position 82, the distal-most end 60 of the shaft 46 protrudes forward or distally from the annular perimeter edge 70 of the distal body end portion 64 of the body 48, which is held fixed against the flange 30 of the valve 10 or other adjacent area. As such, the distal-most end 60 of the shaft 46 protrudes through the opening 36 of the head portion 28 of the valve body 16.

The mechanic then applies a rotating force to the shaft 46 at, for example the handle portion 20, when the positive feature 50 is proximate the track section distal end 78 to rotate the shaft 46 and correspondingly the valve stem 18 about the longitudinal axis 55. As this happens, the positive feature 50 moves through the track section 84 that restricts the shaft 46 from translating along the longitudinal axis 55 while the shaft 46 rotates relative to the body 48. When the shaft 46 is rotated to the rotated-extended position 88, the valve 10 is in the open position. Correspondingly, the retainer 22 retains or otherwise holds the tabs 42 of the valve stem 18 to keep the valve 10 in the open position while fuel including condensates and/or contaminants/deposits flow from the fuel tank 11 through the valve 10. Once a desired quantity of content from the fuel tank 11 has been removed, the mechanic rotates the shaft 46 back to the extended position 82 so that the tabs 42 can move back through the openings 51 of the retainer 22 as the biasing element 106 pushes the shaft 46 back to the nominal position 80 to close the valve 10.

In an exemplary embodiment, the tool 41 is manually operated by the mechanic for replacement of the O-ring 40 of the valve 10. In a non-limiting example, the mechanic positions the tool 41 on the valve 10 when the valve 10 is in the closed position. The feature 58 of the shaft 46 engages or otherwise couples to the valve engagement feature 38 of the valve 10 with the shaft 46 in the nominal position 80. Next, the mechanic applies a rotating force to the shaft 46 to rotate the shaft 46 and the corresponding valve stem 18. As the shaft 46 and the valve stem 18 rotate relative to the body 48, the positive feature 50 moves through the track section 90 that restricts the shaft 46 from translating along the longitudinal axis 55 until the shaft 46 is in the rotated-nominal position 94. In the rotated-nominal position 94, the biasing element 106 pushes or otherwise biases the shaft 46 to the retracted-rotated position and the valve stem 18, which is biased by the biasing element 20 in the water drain valve 10, moves to the O-ring change position. When the shaft 46 is in the retracted-rotated position, the distal-most end 60 of the shaft 46 is submerged proximally from the annular perimeter edge 70 of the distal body end portion 64 of the body 48. In the O-ring change position, the O-ring is exposed for service and/or replacement. Once the O-ring 40 is replaced, the mechanic pushes the shaft 46 to overcome the bias of the biasing element 106 to move the valve stem 18 from the O-ring change position, and subsequently rotates the shaft 46 back to the nominal position 80.

Referring to FIGS. 1, 3, and 8-10, another exemplary embodiment for a tool 141 for actuating the valve 10 is provided. In particular, the tool 141 is similarly configured to (including operation thereof) the tool 41 as illustrated in FIGS. 4-7 including the shaft 46, the body 48, the positive feature 50, the track 68, and the biasing element 106, but with the exception that the body 48 includes or is configured to support a cup 102 that surrounds at least a portion of the distal body end portion 64 of the body 48. In an exemplary embodiment, the body 48 defines a shoulder 104 that supports the cup 102. In one example, the cup 102 is affixed to the shoulder 104 by an adhesive (e.g., epoxy adhesive or the like), welding, or the like. In another example, the cup 102 and the body 48 form a monolithic structure.

In an exemplary embodiment, the cup 102 is configured to capture an effluent stream from the valve 10 when the valve 10 is in the open position. The effluent stream contains fuel including condensates and/or contaminants/deposits from the fuel tank 11. In one example, when the feature 58 of the distal shaft end portion 54 engages with the valve engagement feature 38 to open the valve 10, the cup 102 interfaces, for example, with the flange 30 or an adjacent portion of the aircraft skin 34 to capture the effluent stream.

In an exemplary embodiment and as illustrated, the distal body end portion 64 has slots 72 that are disposed proximally from the annular perimeter edge 70 to allow the effluent stream including fuel, condensates, and/or contaminants/deposits to drain from of the valve 10 through the slots 72 to the cup 102. Although the distal body end portion 64 is illustrated as having four slots, it is to be understood that various embodiments may include the distal body end portion 64 having less than four slots or more than four slots.

Figure 11:
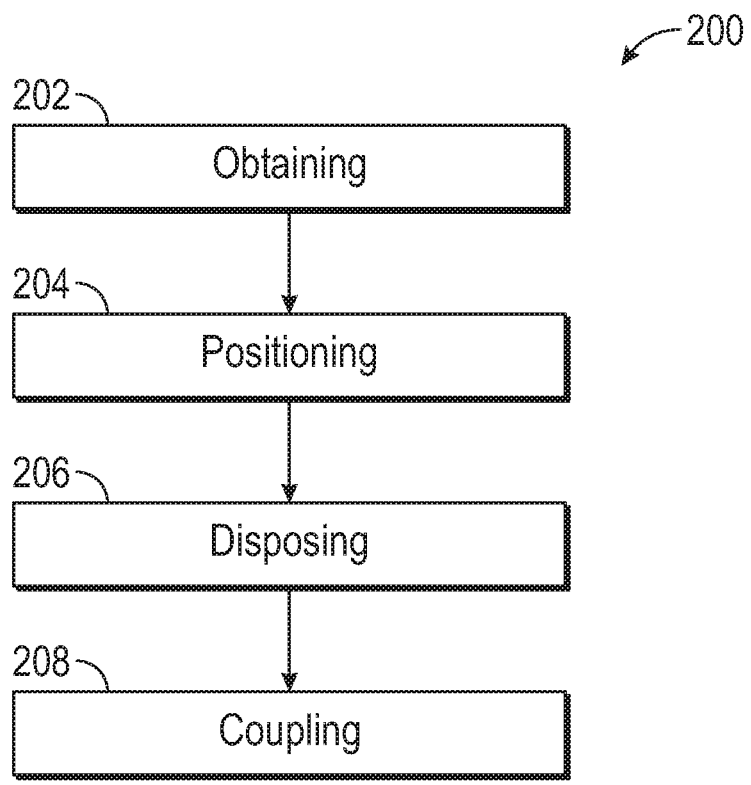
FIG. 11 illustrates a flow diagram for a method for making a tool for actuating a valve in accordance with an exemplary embodiment.

FIG. 11 illustrates a method 200 for making a tool for actuating a valve in accordance with an exemplary embodiment. The method 200 includes obtaining (STEP 202) a shaft. The shaft defines a longitudinal axis and is configured to transfer force to the valve for actuating the valve. A wall of a body is positioned (STEP 204) surrounding at least a portion of the shaft.

The wall defines a track that is formed through the wall of the body. The track has a first track section substantially parallel to the longitudinal axis. A positive feature is disposed (STEP 206) in the track and coupled to the shaft. The shaft is slidingly coupled (STEP 208) to the body. When a force is applied to the shaft to push the valve, the shaft moves relative to the body and the positive feature moves through the first track section that restricts the shaft form being rotated about the longitudinal axis.

Figure 12:
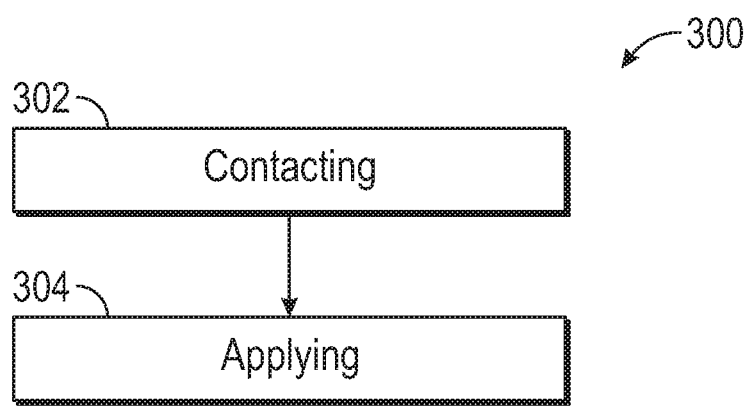
FIG. 12 illustrates a flow diagram for a method for actuating a valve in accordance with an exemplary embodiment.

Referring to FIG. 12, a method 300 for actuating a valve in accordance with an exemplary embodiment. The method 300 includes contacting (STEP 302) the valve with a tool. The tool includes a shaft that defines a longitudinal axis. The shaft is configured to transfer force to the valve for actuating the valve. The tool also includes a body having a wall surrounding at least a portion of the shaft. The wall defines a track that I formed though the wall. The track has a first track section substantially parallel to the longitudinal axis. The tool also includes a positive feature that is coupled to the shaft and disposed in the track. The shaft is slidingly coupled to the body.

A force is applied (STEP 304) to the shaft to push the valve. The shaft moves relative to the body and the positive feature moves though the first track section that restricts the shaft from being rotated about the longitudinal axis.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A tool for actuating a valve, the tool comprising:
a shaft defining a longitudinal axis and configured to transfer force to the valve for actuating the valve, wherein the shaft extends distally from a proximal shaft end portion to a distal shaft end portion, and wherein the distal shaft end portion of the shaft defines a feature for coupling with the valve for actuating the valve;
a body having a wall surrounding a portion of the shaft, wherein the wall defines a track that is formed therein and that has a first track section substantially parallel to the longitudinal axis, wherein the first track section extends distally from a first track section proximal end to a first track section distal end, wherein the body extends distally from a proximal body end portion to a distal body end portion, and wherein the distal body end portion defines an annular perimeter edge that is configured to interface with an outer surface of the valve; and a positive feature coupled to the shaft and disposed in the track, wherein the shaft is slidingly coupled to the body and when a force is applied to the shaft in a direction aligned with the longitudinal axis, the shaft moves relative to the body and the positive feature moves through the first track section that restricts the shaft from being rotated about the longitudinal axis, wherein when the positive feature is proximate the first track section proximal end, the shaft is in a nominal position, and wherein when the positive feature is proximate the first track section distal end, the shaft is in an extended position.

2. The tool of claim 1, wherein the tool further comprises a biasing element having a first portion that engages the shaft and a second portion that engages the body, and wherein when the positive feature is disposed in the first track section, the biasing element biases the shaft towards the nominal position.

3. The tool of claim 1, wherein the track has a second track section extending transversely from the first track section distal end to a second track section lateral end.

4. The tool of claim 3, wherein when the positive feature is proximate the first track section distal end and a rotating force is applied to the shaft to rotate the valve, the positive feature moves through the second track section that restricts the shaft from being translated along the longitudinal axis while the shaft rotates relative to the body, and wherein when the positive feature is proximate the second track section lateral end, the shaft is in a rotated-extended position.

5. The tool of claim 1, further comprising a driver head that is configured to engage the valve, and wherein the feature is configured as a pocket that receives and holds the driver head for actuating the valve.

6. The tool of claim 1, wherein the feature is a positive feature that is configured to directly couple with the valve for actuating the valve.

7. The tool of claim 1, wherein when the shaft is in the nominal position, a distal-most end of the distal shaft end portion of the shaft and the annular perimeter edge of the distal body end portion are substantially aligned about a location along the longitudinal axis.

8. The tool of claim 7, wherein when the shaft is in the extended position, the distal-most end of the distal shaft end portion of the shaft protrudes distally from the annular perimeter edge of the distal body end portion of the body.

9. The tool of claim 3, wherein the track has a third track section extending transversely from the first track section proximal end to a third track section lateral end, and wherein the third track section is substantially parallel to the second track section.

10. The tool of claim 9, wherein when the positive feature is proximate the first track section proximal end and the rotating force is applied to the shaft to rotate the valve, the positive feature moves through the third track section that restricts the shaft from being translated along the longitudinal axis while the shaft rotates relative to the body, and wherein when the positive feature is proximate the third track section lateral end, the shaft is in a rotated-nominal position.

11. The tool of claim 10, wherein the track has a fourth track section substantially parallel to the longitudinal axis and extending proximally from the third track section lateral end to a fourth track section proximal end, and wherein when the positive feature is proximate the fourth track section proximal end, the shaft is in a retracted-rotated position.

12. The tool of claim 11, wherein when the shaft is in the retracted-rotated position, a distal-most end of the distal shaft end portion of the shaft is submerged proximally from the annular perimeter edge of the distal body end portion of the body.

13. The tool of claim 1, wherein the tool further comprises a cup that surrounds the distal body end portion of the body and that is configured for capturing effluent released from the valve when actuated.

14. The tool of claim 13, wherein the body defines a shoulder, and wherein the cup is disposed on the shoulder of the body.

15. The tool of claim 13, wherein the cup and the body form a monolithic structure.

16. A method for making a tool for actuating a valve, the method comprising the steps of:

obtaining a shaft that defines a longitudinal axis and that is configured to transfer force to the valve for actuating the valve, the second occurence of, wherein the shaft extends distally from a proximal shaft end portion to a distal shaft end portion, and wherein the distal shaft end portion of the shaft defines a feature for coupling with the valve for actuating the valve;

positioning a wall of a body surrounding a portion of the shaft, wherein the wall defines a track that is formed therein and that has a first track section substantially parallel to the longitudinal axis, wherein the first track section extends distally from a first track section proximal end to a first track section distal end, wherein the body extends distally from a proximal body end portion to a distal body end portion, and wherein the distal body end portion defines an annular perimeter edge that is configured to interface with an outer surface of the valve;

disposing a positive feature that is coupled to the shaft in the track; and slidingly coupling the shaft to the body such that when a force is applied to the shaft in a direction aligned with the longitudinal axis, the shaft moves relative to the body and the positive feature moves through the first track section that restricts the shaft from being rotated about the longitudinal axis, wherein when the positive feature is proximate the first track section proximal end, the shaft is in a nominal position, and wherein when the positive feature is proximate the first track section distal end, the shaft is in an extended position.

17. A method for actuating a valve, the method comprising the steps of:

contacting the valve with a tool, wherein the tool comprises:

a shaft defining a longitudinal axis and configured to transfer force to the valve for actuating the valve, wherein the shaft extends distally from a proximal shaft end portion to a distal shaft end portion, and wherein the distal shaft end portion of the shaft defines a feature for coupling with the valve for actuating the valve;

a body having a wall surrounding a portion of the shaft, wherein the wall defines a track that is formed therein and that has a first track section substantially parallel to the longitudinal axis, wherein the first track section extends distally from a first track section proximal end to a first track section distal end, wherein the body extends distally from a proximal body end portion to a distal body end portion, and wherein the distal body end portion defines an annular perimeter edge that is configured to interface with an outer surface of the valve; and a positive feature coupled to the shaft and disposed in the track, wherein the shaft is slidingly coupled to the body; and applying a force to the shaft in a direction aligned with the longitudinal axis, moving the shaft relative to the body and the positive feature through the first track section that restricts the shaft from being rotated about the longitudinal axis, wherein when the positive feature is proximate the first track section proximal end, the shaft is in a nominal position, and wherein when the positive feature is proximate the first track section distal end, the shaft is in an extended position.

* * * * *